(12) United States Patent
Shaffer et al.

(10) Patent No.: US 7,331,582 B2
(45) Date of Patent: *Feb. 19, 2008

(54) GASKET

(75) Inventors: William V. Shaffer, Powell, OH (US);
William C. Andrick, North Canton, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 90 days.

This patent is subject to a terminal disclaimer.

(21) Appl. No.: 11/137,431

(22) Filed: May 26, 2005

(65) Prior Publication Data

US 2005/0218653 A1    Oct. 6, 2005

Related U.S. Application Data

(62) Division of application No. 10/356,732, filed on Feb. 3, 2003, now Pat. No. 6,948,718.

(51) Int. Cl.
*F16L 21/02* (2006.01)

(52) U.S. Cl. .................. 277/625; 277/626; 277/616; 277/604

(58) Field of Classification Search ............... 277/604, 277/616, 625, 626
See application file for complete search history.

(56) References Cited

U.S. PATENT DOCUMENTS

| 2,259,940 | A |   | 10/1941 | Nathan |
| 2,882,073 | A |   | 4/1959  | James |
| 2,898,131 | A |   | 8/1959  | Kurtz |
| 2,953,398 | A |   | 9/1960  | Haugen et al. |
| 3,244,797 | A |   | 4/1966  | Watson |
| 3,315,971 | A |   | 4/1967  | Sakurada |
| 3,520,047 | A |   | 7/1970  | Muhlner et al. |
| 3,584,889 | A |   | 6/1971  | Sheets |
| 3,632,732 | A |   | 1/1972  | Osterhagen et al. |
| 3,749,543 | A |   | 7/1973  | Stansbury |
| 3,806,301 | A |   | 4/1974  | Osterhagen et al. |
| 3,823,216 | A |   | 7/1974  | Petzetakis |
| 3,858,912 | A | * | 1/1975  | Bower .................. 285/230 |

(Continued)

FOREIGN PATENT DOCUMENTS

DE    102005001708 A1 *  7/2006

(Continued)

OTHER PUBLICATIONS

Corma Inc. "Vacuum Method versus Blow Molding Method", pp. 1-7, Aug. 1992.

(Continued)

*Primary Examiner*—Alison K Pickard
(74) *Attorney, Agent, or Firm*—Finnegan, Henderson, Farabow, Garrett & Dunner, L.L.P.

(57) ABSTRACT

An annular gasket for affecting a watertight seal between two sections of corrugated pipe. The gasket comprises a seating portion dimensioned to fit within an annular recess in one of the mated sections of corrugated pipe, and a sealing portion integrally molded with the seating portion. The sealing portion includes a first shoulder portion, a second shoulder portion, and an arcuate surface extending between the first and second shoulder portions. The mass of the seating portion is less than the mass of the sealing portion.

9 Claims, 3 Drawing Sheets

U.S. PATENT DOCUMENTS

| | | | |
|---|---|---|---|
| 3,998,578 A | 12/1976 | Acda | |
| 4,005,968 A | 2/1977 | Crawford | |
| 4,030,872 A | 6/1977 | Parmann | |
| RE29,446 E | 10/1977 | Sonnleitner et al. | |
| 4,107,249 A | 8/1978 | Murai et al. | |
| 4,134,949 A | 1/1979 | McGregor | |
| 4,150,087 A | 4/1979 | de Putter et al. | |
| 4,157,372 A | 6/1979 | Kyomen | |
| 4,161,384 A | 7/1979 | McGregor | |
| 4,170,448 A | 10/1979 | French | |
| 4,177,237 A | 12/1979 | Ueno et al. | |
| 4,204,823 A | 5/1980 | Hayes et al. | |
| 4,218,208 A | 8/1980 | Hayes et al. | |
| 4,239,473 A | 12/1980 | Fulbaber | |
| 4,266,926 A | 5/1981 | Gordon | |
| 4,277,231 A | 7/1981 | Gordon | |
| 4,279,853 A | 7/1981 | Ohta | |
| 4,299,412 A | 11/1981 | Parmann | |
| 4,315,630 A | 2/1982 | French | |
| 4,331,625 A | 5/1982 | Van De Zee et al. | |
| 4,338,716 A | 7/1982 | Marissen et al. | |
| 4,353,860 A | 10/1982 | Gordon | |
| 4,362,187 A | 12/1982 | Harris et al. | |
| 4,379,115 A | 4/1983 | Seach et al. | |
| 4,395,379 A | 7/1983 | Herder et al. | |
| 4,428,591 A | 1/1984 | Marissen et al. | |
| 4,474,726 A | 10/1984 | Ohta et al. | |
| 4,481,978 A | 11/1984 | Escandell | |
| 4,545,951 A | 10/1985 | Gordon | |
| 4,643,658 A | 2/1987 | Gordon | |
| 4,702,502 A * | 10/1987 | Shade et al. | 285/231 |
| 4,723,905 A | 2/1988 | Vassallo et al. | |
| 4,826,028 A | 5/1989 | Vassallo et al. | |
| 4,834,430 A | 5/1989 | Vassallo et al. | |
| 4,865,362 A | 9/1989 | Holden | |
| 4,880,579 A | 11/1989 | Murata et al. | |
| 4,906,010 A | 3/1990 | Pickering et al. | |
| 4,915,425 A | 4/1990 | Hegler et al. | |
| 4,946,206 A * | 8/1990 | Roe et al. | 285/369 |
| 4,968,241 A | 11/1990 | Darling | |
| 5,064,207 A | 11/1991 | Bengtsson | |
| 5,158,389 A | 10/1992 | Osterwald et al. | |
| 5,296,188 A | 3/1994 | Lupke | |
| 5,324,083 A * | 6/1994 | Vogelsang | 285/110 |
| 5,348,051 A | 9/1994 | Kallenbach | |
| 5,992,469 A | 11/1999 | Hegler | |
| 6,082,741 A | 7/2000 | Gregoire et al. | |
| 6,199,592 B1 | 3/2001 | Siferd et al. | |
| 6,336,640 B1 * | 1/2002 | Knapp | 277/606 |
| 6,948,718 B2 * | 9/2005 | Shaffer et al. | 277/626 |

FOREIGN PATENT DOCUMENTS

| | | | |
|---|---|---|---|
| GB | 2123904 | * | 2/1984 |
| JP | 11-218280 | * | 8/1999 |

OTHER PUBLICATIONS

Corma Inc. "Fabricators of the Best-Selling Corrugator Equipment in the World", Jun. 1997.

Tim Toliver, "Composite Material Pipe Joint Design and Analysis for 36" Diameter Corrugated High Density Polyethylene (HDPE) Pipe", Jan. 2002.

* cited by examiner

GASKET

This is a divisional application of Application Ser. No. 10/356,732, filed Feb. 3, 2003, now U.S. Pat. No. 6,948,718 which is incorporated herein by reference.

I. BACKGROUND OF THE INVENTION

It is well known to use an annular gasket between mated male and female pipe end sections to form a fluid-tight seal. In most applications, the annular elastomeric gasket is disposed around the end of the male pipe section. In many applications, the gasket is seated in an annular groove that extends around the end of the male pipe section. See, for example, U.S. patent application Ser. No. 10/037,219, for a PIPE HAVING WATERTIGHT INLINE BELL, filed Nov. 9, 2001.

In ground water drainage systems, corrugated pipe of various diameters are used. Sections of such pipe are joined by mating a female end or bell, and a male end or spigot. As with any fluid conveyance piping system, proper sealing at the joined ends is necessary. Unlike many piping systems, corrugated pipe used for ground water drainage is subjected to numerous stresses during installation and use that must be accommodated by any annular gasket disposed between bell and spigot.

During mating of the pipe sections, a gasket is disposed around the end of the spigot. Due to contact with the bell during the mating, the gasket is subjected to forces tending to displace (e.g., roll) the gasket relative to the spigot. Even if the gasket is seated in an annual groove, the forces acting on the gasket during mating of spigot and bell may dislodge the gasket from the groove.

During use, a corrugated pipe system is subjected to inward pressure from the soil and rocks surrounding the pipe system, to outward pressure from fluid flowing through the pipe system, and to pressure from ground water in the soil that acts externally on the pipe system. These forces cause the pipe sections to flex axially and radially. Such movement requires a gasket that can accommodate variations in distance between bell and spigot, relative movement between bell and spigot, and infiltration of ground water tending to move the gasket relative to the bell and spigot.

The gasket disclosed and claimed herein, while having application in various pipe systems, is particularly effective in resisting the various forces that impact on ground water drainage systems, such as those comprising corrugated pipes. In addition, the gasket provides a sufficient sealing range to accommodate manufacturing tolerances. Further, the gasket provides a cost-effective design by providing sufficient sealing while minimizing the amount of material needed for the gasket. Additional advantages of the invention are set forth in part in the description which follows, and in part will be obvious from the description or may be learned by practice of the invention.

II. SUMMARY OF THE INVENTION

The objects and advantages of the invention may be realized and attained by means of features and combinations particularly pointed out in the appended claims.

The invention, as broadly described herein, is a gasket for providing a seal between mated pipe sections. In accordance with the invention, the gasket comprises a seating portion dimensioned to fit within an annular recess in one of the mated sections of pipe. Preferably, the seating portion extends radially inwardly for disposition in an annular recess in the male end or spigot of a corrugated pipe section. In a preferred embodiment, the surface of the seating portion includes one or more annularly-extending external ribs disposed to engage the annular recess and resist radial movement and removal from the recess. The seating portion may also include an annular cavity that provides a limited flexibility without affecting strength or resistance to displacement from the recess. The shape and size of the cavity may be adjusted to achieve a desired sealing force.

In accordance with the invention, the gasket further comprises a sealing portion integrally molded with the seating portion including first and second shoulder portions and an arcuate sealing surface extending between the first and second shoulder portions in radially opposed relation to the seating portion. The first shoulder portion extends from the seating portion and is disposed to engage the surface of the male end or spigot adjacent one side of the annular recess, and the second shoulder portion extends in the opposite direction from the seating portion a distance greater than the first shoulder portion and is disposed to engage more of the surface of the male end or spigot adjacent the other side of the annular recess than is engaged by the first shoulder. In a preferred embodiment, the second shoulder portion includes an annular V-shaped notch between the sealing surface and the surface of the spigot engaged by the shoulder portion, the notch preferably being open toward the upstream direction. It may also be preferred to include annularly extending ridges on the sealing surface to assist frictional engagement of the bell and to fill minor longitudinal die lines or imperfections on the bell sealing surface.

The present invention also includes an annular gasket for affecting a watertight seal between two sections of corrugated pipe. The gasket comprises a seating portion dimensioned to fit within an annular recess in one of the mated sections of corrugated pipe. The gasket also comprises a sealing portion integral with the seating portion. The sealing portion includes a shoulder portion for resting on a crown on an upstream side of the recess, a shoulder portion for resting on a crown on a downstream side of the recess, and an arcuate surface extending between the first and second shoulder portions.

The present invention further includes an annular gasket for affecting a watertight seal between two sections of corrugated pipe. The gasket comprises a seating portion dimensioned to fit within an annular recess in one of the mated sections of corrugated pipe, and a sealing portion integrally molded with the seating portion and including first and second shoulder portions and an arcuate surface extending between the first and second shoulder portions. The shape of the sealing portion causes the gasket to have an eccentric axis of rotation about the annular axis of the gasket.

The present invention further includes an annular gasket for affecting a watertight seal between two sections of corrugated pipe. The gasket comprises a seating portion, dimensioned to fit within an annular recess located in a corrugation of one of the mated sections of corrugated pipe, and a sealing portion integrally molded with the seating portion. The sealing portion includes first and second shoulder portions that span almost the entire width of the corrugation, and the shape of the sealing portion causes the gasket to have an eccentric axis of rotation.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

III. BRIEF DESCRIPTION OF THE DRAWINGS

The accompanying drawings, which are incorporated in and constitute a part of the specification, illustrate embodiments of the invention, and, together with the description, serve to explain the principles of the invention.

IV. DESCRIPTION OF THE PREFERRED EMBODIMENTS

Reference will now be made in detail to the presently preferred embodiments of the invention, examples of which are illustrated in the accompanying drawings.

Figure 1:
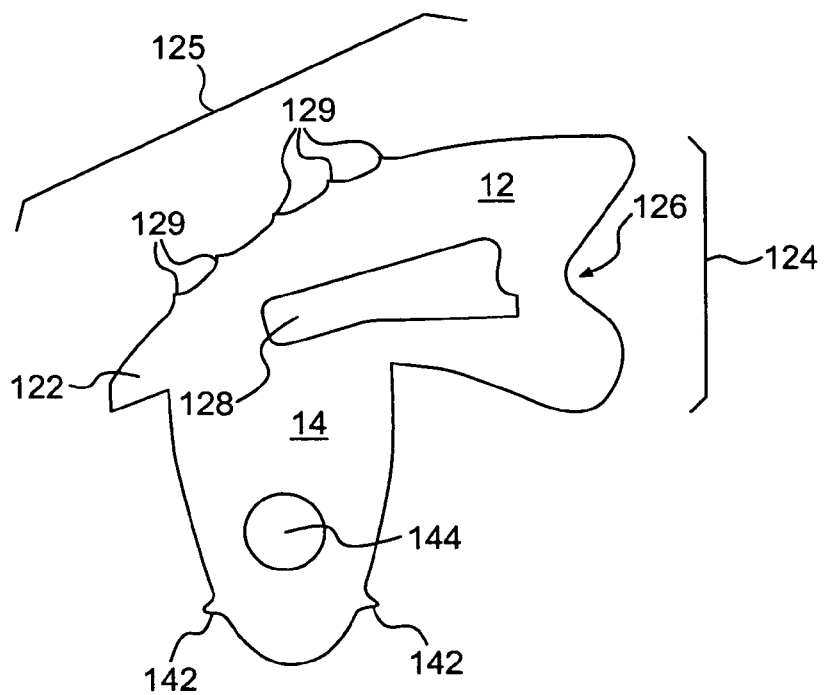
FIG. 1 is a cross-section of a first embodiment of the gasket of the present invention.

As shown in FIG. 1, an embodiment of the gasket of the present invention is an integral unit that includes a sealing portion 12 and a seating portion 14. The seating portion 14 is preferably shaped to fit within a recess of a mini-corrugation of a pipe (see FIG. 2) or in a recess between corrugations of a pipe (not shown). The seating portion 14 may optionally include at least one annularly-extending ridge 142 that improves gripping of the seating portion within the recess and fills longitudinal die lines and minor imperfections in the recess' sealing surface. The seating portion may additionally include a cavity 144 that allows the gasket to adjust to forces that it may be subjected to during use.

The sealing portion 12 preferably includes a downstream shoulder 122 and an upstream shoulder 124. An arcuate surface 125 extends from the downstream shoulder 122 to the upstream shoulder 124 to form the sealing surface of the gasket 10. The arcuate surface 125 may optionally include ridges 129. The sealing portion 12 may also include a V-shaped notch 126 in the upstream shoulder 124, and/or a cavity 128 that allows the gasket to adjust to forces that it may be subjected to during use. The first and second shoulder portions span almost the entire width of the corrugation, thus desirably distributing the sealing force over the width of the corrugation.

The shape of the gasket 10 and the ratio of the mass of the sealing portion 12 to the seating portion 14 optimizes the sealing ability (e.g., the area of the arcuate surface 125) of the gasket while allowing effective seating of the gasket for a given overall gasket mass.

Figure 2:
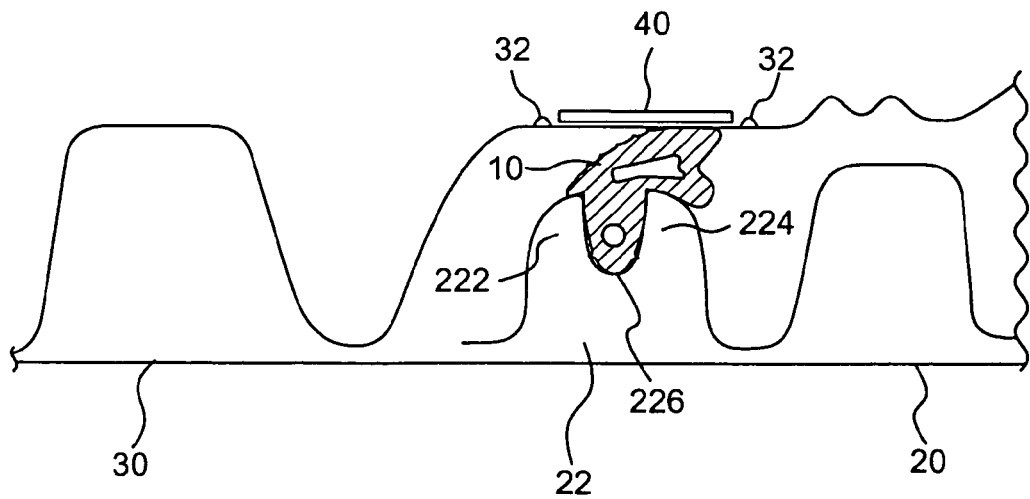
FIG. 2 is a cross-section of the gasket of FIG. 1, seated in mated male and female pipe sections.

Referring to the embodiment illustrated in FIG. 2, in use the seating portion 14 of the gasket 10 is placed in a recess 226 in a mini-corrugation 22. The mini-corrugation 22 is usually located on a male end or "spigot" 20 of a corrugated pipe. Upon placement of the gasket 10 in the recess 226, the downstream shoulder 122 of the gasket rests on a downstream crown 222 of the mini-corrugation 22, and the upstream shoulder 124 of the gasket rests on an upstream crown 224 of the mini-corrugation 22.

Thereafter, a female end or "bell" 30 of a corrugated pipe is mated to the male end 20 to form a joint as depicted in FIG. 2. During mating of the male and female ends of pipe, the slope of the arcuate surface 125 of the gasket helps to prevent dislodging of the gasket 10 from its recess 226 because the distal end of the female portion is less likely to catch on a portion of the sloping arcuate surface. In addition, the seating of shoulders 122, 124 on crowns 222, 224, respectively, increases stability of the gasket in the recess and helps to prevent gasket 10 from being dislodged from the recess. Finally, the fact that the upstream shoulder 124 is larger than the downstream shoulder 122 offsets the axis of rotation of the gasket, so that the gasket is less likely to rotate out of the recess during mating of male and female ends of the pipe.

Due to the shape of the gasket and its placement within the mini-corrugation, in use the downward sealing force exerted on the gasket 10 by the female end 30 is focused on shoulder 124 over the upstream crown 224 of the mini-corrugation. The placement of the V-shaped notch 126 directly under the downward sealing force F causes the V-shaped notch to contract in response to forces caused by normal environmental pressure on the joint (e.g., radially inward pressure from dirt and stones). In addition, the external hydrostatic pressure from excess groundwater exerts a force against the V-shaped notch in a direction generally parallel to the longitudinal direction of the pipe. The V-shaped notch responds to this force by tending to expand radially, thereby increasing the sealing force.

The pipe's internal hydrostatic pressure exerts a force on the gasket that is generally parallel to, but opposite, the force exerted by the external hydrostatic pressure. This force acts on the arcuate surface of the sealing portion in a manner that would cause the gasket to roll out of its recess were it not for the gasket's offset center of rotation described above.

Ridges 129 on arcuate surface 125 improve sealing of the joint by filling any minor surface imperfections in the bell-sealing surface. A common imperfection in extruded plastic pipe is longitudinal die lines, and such small imperfections are easily filled and therefore sealed by the annular ridges 129.

Ridges 129 on arcuate surface 125 also improve sealing of the joint by increasing the gripping action (friction) between arcuate surface 125 and the inner surface of the female end 30 that abuts arcuate surface 125. In use, the friction force caused by the abutment resists separation of the male and female ends. To further improve sealing of the joint, there may also be provided an annular reinforcing band 40 that surrounds the female end 30, preferably at a position above the gasket 10 to increase the sealing force F applied to the gasket 10. The female end may include protrusions 32 that facilitate proper placement of the annular reinforcing band 40 around the female end.

Figure 3:
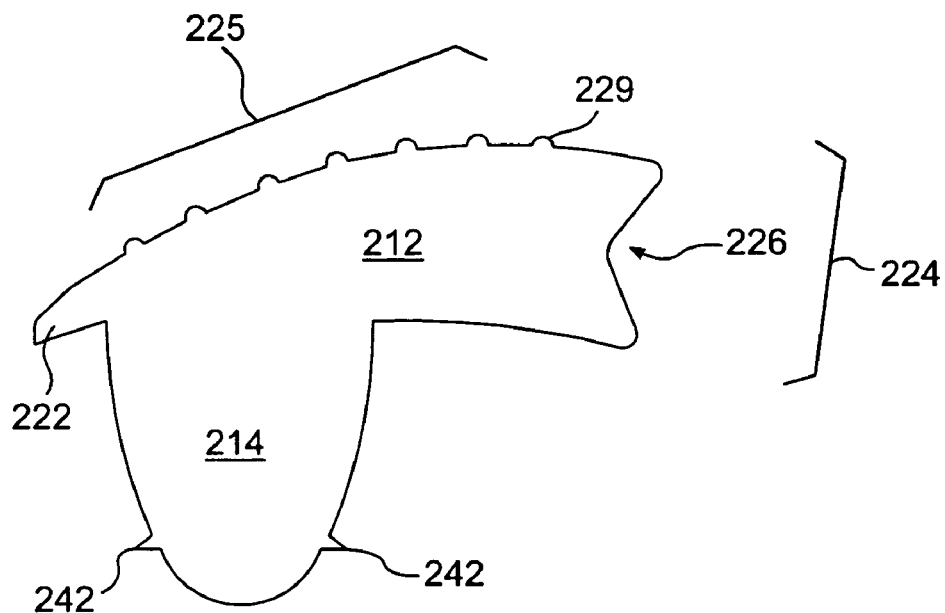
FIG. 3 is a cross-section of a second embodiment of the gasket of the present invention.

FIG. 3 illustrates a second embodiment of the present invention, showing no cavities in either the sealing portion 212 or the seating portion 214. The downstream shoulder 224 of the second embodiment is narrower than the downstream shoulder 124 of the first embodiment. The second embodiment is shown to include a V-shaped notch 226 in the downstream shoulder 224, ridges 229 on its arcuate surface 225 that extends between its upstream shoulder 222 and its downstream shoulder 224, and ridges 242 on the seating portion 214.

Figure 4:
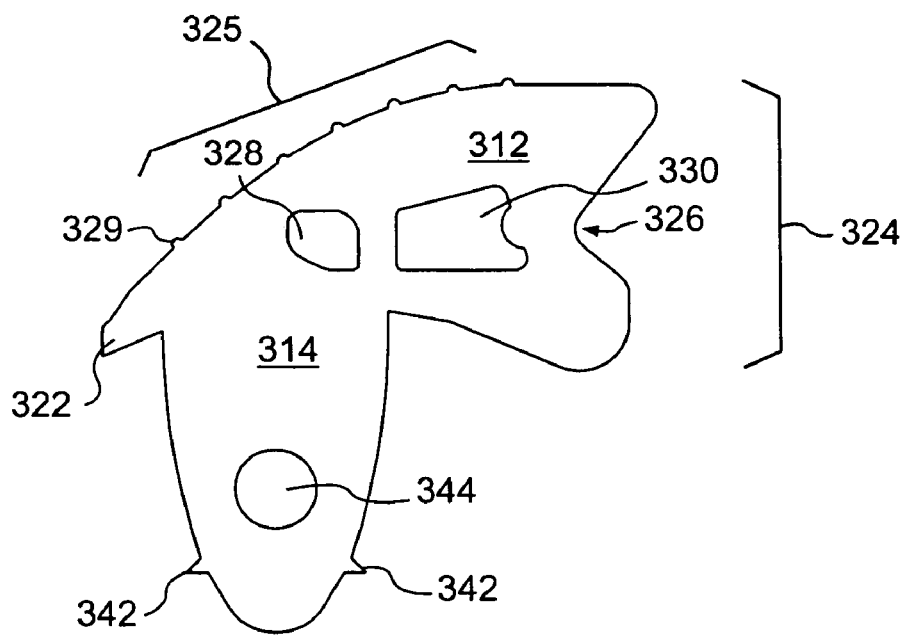
FIG. 4 is a cross-section of a third embodiment of the gasket of the present invention.

FIG. 4 illustrates a third embodiment of the present invention, showing two cavities 328, 330, in the sealing portion 312. The third embodiment is shown to include a V-shaped notch 326 in the downstream shoulder 324, ridges 329 on its arcuate surface 325 that extends between its upstream shoulder 322 and its downstream shoulder 324, and ridges 342 on the seating portion 314. The seating portion 314 is shown to include a cavity 344.

Figure 5:
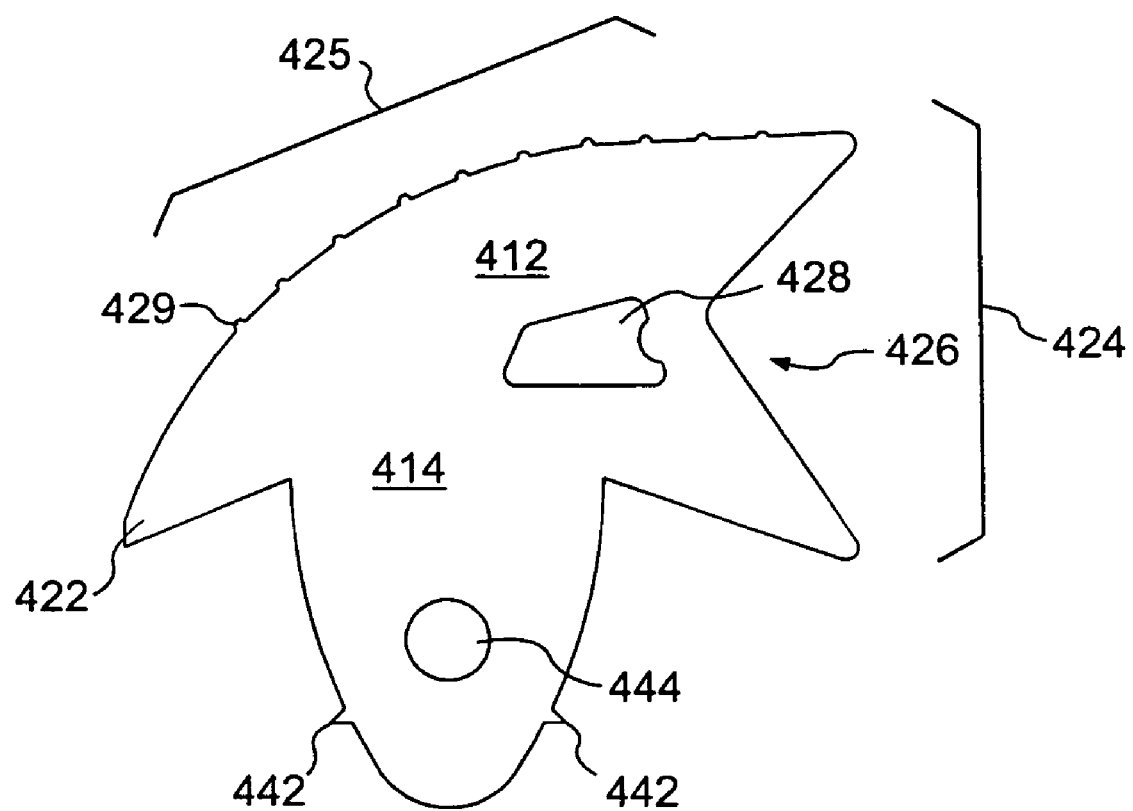
FIG. 5 is a cross-section of a fourth embodiment of the gasket of the present invention.

FIG. 5 illustrates a fourth embodiment of the present invention, wherein the downstream shoulder 424 of the fourth embodiment is wider than the downstream shoulder 124 of the first embodiment. The fourth embodiment is shown to include a single cavity 428 in the sealing portion 412 that is smaller than the cavity 128 in the sealing portion of the first embodiment, and a V-shaped notch 426 in the downstream shoulder 424. The fourth embodiment is shown to have ridges 429 on its arcuate surface 425 that extends between its upstream shoulder 422 and its downstream shoulder 424, and ridges 442 on the seating portion 414.

The gasket preferably is made from an elastomeric material or a thermoplastic elastomer, and more preferably is made from polyisoprene.

The size of the gasket of the present invention preferably varies with the size of the pipe to be sealed, so that a larger pipe will utilize a larger gasket.

It will be apparent to those skilled in the art that various modifications and variations can be made in the gasket of the present invention and in construction of this gasket without departing from the scope or spirit of the invention. For example, the gasket of the present invention is illustrated in corrugated pipe but could also be used in other types of pipe or for any type of sealing that requires mating of two parts where such mating could dislodge a sealing gasket. Also, the gasket need not be an annular gasket, but can be applied in any shape and size to create a fluid-tight seal between two components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An annular gasket for affecting a watertight seal between two mated sections of corrugated pipe, the gasket comprising:
   a seating portion dimensioned to fit within an annular recess in one of the mated sections of corrugated pipe; and
   a sealing portion integrally molded with the seating portion and located substantially atop the seating portion, the sealing portion including a first shoulder portion configured to engage a first crown portion of the annular recess in one of the mated sections of corrugated pipe, a second shoulder portion configured to engage a second crown portion of the annular recess in one of the mated sections of corrugated pipe, and a convex surface extending between the first and second shoulder portions;
   wherein the sealing portion is shaped to cause the gasket to have an eccentric axis of rotation.

2. The gasket of claim 1, wherein the first shoulder portion extends outwardly from the seating portion in a first direction, and the second shoulder portion extends outwardly from the seating portion in a second direction that is substantially opposite the first direction.

3. The gasket of claim 1, wherein the second shoulder portion includes an annular V-shaped notch disposed between the arcuate surface and the one mated pipe section.

4. The gasket of claim 1 wherein, when the gasket is seated in the recess, the shape of the sealing portion and its position cause radial sealing forces exerted on the gasket during use of the corrugated pipe to act on the second shoulder portion.

5. The gasket of claim 1, wherein the first shoulder portion comprises a downstream shoulder portion, the second shoulder portion comprises an upstream shoulder portion, the first crown portion comprises a downstream crown portion, and the second crown portion comprises an upstream crown portion.

6. An annular gasket for affecting a watertight seal between two mated sections of corrugated pipe, the gasket comprising:
   a seating portion dimensioned to fit within an annular recess located in a corrugation of one of the mated sections of corrugated pipe; and
   a sealing portion integrally molded with the seating portion and including a downstream shoulder portion configured to fit a downstream crown portion of the annular recess, an upstream shoulder portion configured to fit an upstream crown portion of the annular recess, and a substantially convex surface extending between the upstream shoulder portion and the downstream shoulder portion, the downstream shoulder portion extending outwardly from the seating portion in a first direction, and the upstream shoulder portion extending outwardly from the seating portion in a second direction that is substantially opposite the first direction,
   wherein the sealing portion is shaped to cause the gasket to have an eccentric axis of rotation.

7. The gasket of claim 6, wherein the sealing portion extends substantially atop the seating portion.

8. The gasket of claim 6, wherein the upstream shoulder portion includes an annular V-shaped notch disposed between an arcuate surface extending between the downstream and upstream shoulder portions, and the one mated pipe section.

9. The gasket of claim 6, wherein when the gasket is seated in the recess, the shape of the sealing portion and its position cause radial sealing forces exerted on the gasket during use of the corrugated pipe to act on the upstream shoulder portion.

* * * * *